United States Patent [19]

Hucul et al.

[11] Patent Number: 5,654,253
[45] Date of Patent: Aug. 5, 1997

[54] PROCESS FOR HYDROGENATING AROMATIC POLYMERS

[75] Inventors: Dennis A. Hucul, Midland; Stephen F. Hahn, Sanford, both of Mich.

[73] Assignee: The Dow Chemical Company, Midland, Mich.

[21] Appl. No.: 627,206

[22] Filed: Apr. 3, 1996

Related U.S. Application Data

[62] Division of Ser. No. 434,636, May 4, 1995.

[51] Int. Cl.$^6$ .................................................. B01J 21/08
[52] U.S. Cl. .................... 502/240; 502/258; 502/259; 502/260; 502/261; 502/262
[58] Field of Search .................................. 502/240, 258, 502/259, 260, 261, 262

[56] References Cited

U.S. PATENT DOCUMENTS

| | | |
|---|---|---|
| 4,112,032 | 9/1978 | Biaszyk et al. . |
| 4,452,951 | 6/1984 | Kubo et al. . |
| 5,028,665 | 7/1991 | Hucul . |
| 5,110,779 | 5/1992 | Hucul . |
| 5,352,744 | 10/1994 | Bates et al. . |

FOREIGN PATENT DOCUMENTS

| | | |
|---|---|---|
| 641706 | 6/1987 | Japan . |
| 376705 | 8/1989 | Japan . |
| 376706 | 8/1989 | Japan . |
| 381301 | 8/1989 | Japan . |
| 4106107 | 8/1990 | Japan . |
| 4108809 | 8/1990 | Japan . |
| 597916 | 10/1991 | Japan . |

OTHER PUBLICATIONS

Glass Temperature of Hydrogenated Polystryene, J. Macromol. Sci. (Chem.), A1(5), 943–953 (1967).
Heterogeneous Catalytic Hydrogenation of Poly(stryrene), Macromolecules, 26, 4122–4127 (1993).
Applied Heterogeneous Catalysis, Institut Francais du Petrole Publications, pp. 75–123 (1987).
Successful Design of Catalysts, Studies in Surface Science and Catalysis, V. 44, pp. 146–158(1989).
Structure and Properties of Poly(Vinyl Cyclohexane), Polymer Letters, V. 7, pp. 427–435 (1969).
Conformational Asymmetry in Poly(vinylcyclohexane) Containing Diblock Copolymers, JACS, V. 27, pp. 3611–3618 (1994).
Synthesis and Characterization of Poly(vinyclcyclohexane) Derivatives, J. Poly. Sci, Part B Polym. Phys. V. 33, pp. 1527–1536 (1995).

*Primary Examiner*—Bernard Lipman

[57] ABSTRACT

The present invention is a process of hydrogenating high molecular weight aromatic polymers comprising hydrogenating the high molecular weight aromatic polymer in the presence of a silica supported metal hydrogenation catalyst, characterized in that the silica has a pore size distribution such that at least 98 percent of the pore volume is defined by pores having diameter of greater than 600 angstroms.

5 Claims, No Drawings

PROCESS FOR HYDROGENATING AROMATIC POLYMERS

CROSS-REFERENCE TO RELATED APPLICATION

This is a divisional of application Ser. No. 08/434,636 filed May 4, 1995.

The present invention is directed to a process for hydrogenating a high molecular weight aromatic polymer.

BACKGROUND OF THE INVENTION

Aromatic polymers have been previously hydrogenated using a variety of catalysts and conditions. Historically, typical hydrogenation catalysts have low reactivity, require high catalyst to polymer ratios and hydrogenate low molecular weight (less than 20,000) aromatic polymers. Hydrogenation of high molecular weight (Mw) aromatic polymers have also required high temperature and/or pressure conditions in order to achieve high hydrogenation levels. However, these conditions may cause polymer degradation.

Japanese Patent Application 03076706 describes a process for hydrogenating an aromatic polymer using a silica supported metal hydrogenation catalyst. These catalysts use a silica support of small pore diameter (200 to 500 angstroms), high surface area (100–500 m$^2$/g) and achieve hydrogenation levels of greater than 70 percent. However, to achieve high hydrogenation levels, large amounts of catalyst (1–100 weight percent based on resin) and high temperatures (170° C.) are required which cause polymer degradation as exemplified by the decrease in the Mw after hydrogenation.

U.S. Pat. No. 5,028,665 describes a process for hydrogenating an unsaturated polymer using a supported metal hydrogenation catalyst wherein the support contains a majority of pores having diameters greater than 450 angstroms. However, the catalyst is limited by a small surface area and enables 90 to 100 percent olefinic hydrogenation but less than 25 percent aromatic hydrogenation.

U.S. Pat. No. 5,352,744 issued to Bates et al. describes a process for hydrogenating poly(alkenyl aromatic) or poly (alkenyl aromatic)/polydiene block copolymers, that provides hydrogenated polymers with 99.5% or greater saturation, using a metal catalyst on an alkaline metal salt support. Although Bates teaches from 0.01 to 10 grams of catalyst per gram of polymer may be used, a ratio of greater than 1.0 gram of catalyst per gram of polymer is needed to reach high hydrogenation levels.

Silica has long been used as a support for metal catalysts. Typically, the silica used as a support has had high surface area (200–600 m$^2$/g) and small average pore diameter (20 to 40 angstroms). Very low hydrogenation levels are obtained when hydrogenating high molecular weight aromatic polymers using metal hydrogenation catalysts supported by this type of silica.

Accordingly, it remains highly desirable to provide a process of hydrogenating an aromatic polymer at high levels which does not exhibit the foregoing disadvantages.

SUMMARY OF THE INVENTION

The present invention is a process for hydrogenating an aromatic polymer comprising contacting the aromatic polymer with a hydrogenating agent in the presence of a silica supported metal hydrogenation catalyst, characterized in that the silica has a surface area of at least 10 m$^2$/g and a pore size distribution such that at least 98 percent of the pore volume is defined by pores having diameter of greater than 600 angstroms, and at least 80 percent aromatic hydrogenation is achieved.

A second aspect of the present invention is a silica supported metal catalyst characterized in that the silica has a surface area of at least 10 m$^2$/g and a pore size distribution such that at least 98 percent of the pore volume is defined by pores having diameter of greater than 600 angstroms.

A third aspect of the present invention is the hydrogenated polymers produced by the process previously described.

Because of the high efficiency of the present catalysts, this process can be used in hydrogenating polystyrene to produce polyvinylcyclohexane without the disadvantages of the prior art.

DETAILED DESCRIPTION OF THE INVENTION

The aromatic polymers useful in the process of the present invention include any polymeric material containing pendant aromatic functionality. Preferably the Mw is from 100,000 to 3,000,000, more preferably from 100,000 to 1,000,000, and most preferably from 100,000 to 500,000. Although high molecular weight aromatic polymers are preferred, aromatic polymers below 100,000 molecular weight may also be hydrogenated by the process of the present invention. Pendant aromatic refers to a structure wherein the aromatic group is a substituent on the polymer backbone and not embedded therein. Preferred aromatic groups are C$_{6-20}$ aryl groups, especially phenyl. These polymers may also contain other olefinic groups in addition to aromatic groups. Preferably, the polymer is derived from a monomer of the formula:

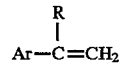

wherein R is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono- or multisubstituted with functional groups such as halo, nitro, amino, cyano, carbonyl and carboxyl. More preferably Ar is phenyl or alkylphenyl with phenyl being most preferred. Homopolymers may have any stereostructure including syndiotactic, isotactic or atactic; however, atactic polymers are preferred. In addition, copolymers containing these aromatic monomers including random, pseudo random, block and grafted copolymers may be used. For example, copolymers of vinyl aromatic monomers and comonomers selected from nitriles, acrylates, acids, ethylene, propylene, maleic anhydride, maleimides, vinyl acetate, and vinyl chloride may also be used such as styrene-acrylonitrile, styrene-alpha-methylstyrene and styrene-ethylene. Block copolymers of vinyl aromatic monomers and conjugated dienes such as butadiene, isoprene may also be used. Examples include styrene-butadiene, styrene-isoprene, styrene-butadiene-styrene and styrene-isoprene-styrene copolymers. Further examples of block copolymers may be found in U.S. Pat. Nos. 4,845,173, 4,096,203, 4,200,718, 4,201,729, 4,205,016, 3,652,516, 3,734,973, 3,390,207, 3,231,635, and 3,030,346. Blends of polymers including impact modified, grafted rubber containing aromatic polymers may also be used.

The silica support used in the process of the present invention has a narrow pore size distribution and surface area greater than 10 meters squared per gram (m$^2$/g).

The pore size distribution, pore volume, and average pore diameter can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 600 angstroms and that the pore volume measured by nitrogen desorption for pores less than 600 angstroms, be less than 2 percent of the total pore volume measured by mercury porosimetry.

The surface area can be measured according to ASTM D-3663-84. The surface area is typically between 10 and 50 $m^2/g$, preferably between 12 and 20 with most preferred between 14 and 17 $m^2/g$.

The desired average pore diameter is dependent upon the aromatic polymer which is to be hydrogenated and its molecular weight. It is preferable to use supports having higher average pore diameters for the hydrogenation of polymers having higher molecular weights to obtain the desired amount of hydrogenation. Average pore diameters are typically between 1000 and 5000 angstroms, preferably between 3000 and 4000 angstroms, most preferably between 3500 and 4000 angstroms. Pore diameters of greater than 5000 angstroms may also be used if the surface area is maintained at the levels specified.

The silica used as the support in the process of the present invention can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica*, John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter.

The metal used in the hydrogenation catalyst can be any metal which will increase the rate of hydrogenation including nickel, cobalt, rhodium, ruthenium, palladium, platinum, other Group VIII metals, or combinations thereof. Preferably rhodium or platinum is used. However, platinum is known to be a poor hydrogenation catalyst for nitriles, therefore, platinum would not be preferred in the hydrogenation of nitrile copolymers.

The silica supported catalyst can be made using the supports described herein, by the process described in U.S. Pat. No. 5,110,779, which is incorporated herein by reference. An appropriate metal or metal containing compound can be deposited on the support by vapor phase deposition, aqueous or nonaqueous impregnation followed by calcination, sublimation or any other conventional method, such as those exemplified in *Studies in Surface Science and Catalysis*, "Successful Design of Catalysts" V. 44, pg. 146–158, 1989 and *Applied Heterogeneous Catalysis* pgs. 75–123, Institute Français du Pétrole Publications, 1987. In methods of impregnation, the appropriate metal containing compound can be any compound containing a metal, as previously described, which will produce a usable hydrogenation catalyst. These compounds can be salts, coordination complexes, organometallic compounds or covalent complexes and are preferably metal halide salts with metal chloride salts being most preferred. Typically, the metal is 0.1 to 10 wt. percent of the silica supported catalyst.

Preferable amounts are from 0.5 to 8 wt. percent, more preferably 1 to 5 wt. percent based on total catalyst weight.

Promoters, such as alkali, alkali earth or lanthanide containing compounds, can also be used to aid in the dispersion of the metal onto the silica support or stabilization during the reaction, though their use is not preferred.

The amount of catalyst used in the hydrogenation process is much smaller than the amount required in conventional aromatic polymer hydrogenation reactions due to the high reactivity of the present catalysts. Generally, amounts of less than 1 gram of catalyst per gram of aromatic polymer are used, with less than 0.1 gram being preferred and less than 0.05 being more preferred. The amount of catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight catalyst to 200,000 or more parts aromatic polymer since the catalyst is reused many times during the course of continuous operation. Typical batch processes can use 1 part by weight catalyst to 5,000 parts aromatic polymer. Higher temperatures and pressures will also enable using smaller amounts of catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in Mw, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in Mw of 20 percent or more. Preferably, a Mw decrease after hydrogenation will be less than 10 percent. However, polymers such as poly-alpha-methylstyrene or other alpha substituted vinyl aromatic polymers which are more prone to polymer degradation, can tolerate a decrease in Mw of up to 30 percent.

Typical hydrogenation temperatures are from about 50° C. preferably from about 100° C., more preferably from about 110° C., and most preferably from about 120° C. to about 250° C., preferably to about 200° C., more preferably to about 180° C., and most preferably to about 160° C.

The pressure of the hydrogenation reaction is not critical, though hydrogenation rates increase with increasing pressure. Typical pressures range from atmospheric pressure to 10,000 psig with 500 to 1500 psig being preferred.

The reaction vessel is purged with an inert gas to remove oxygen from the reaction area. Inert gases include but are not limited to nitrogen, helium, and argon, with nitrogen being preferred.

The hydrogenating agent can be any hydrogen producing agent which will efficiently hydrogenate the aromatic polymer. Hydrogenating agents include but are not limited to hydrogen gas, hydrazine and sodium borohydride. In a preferred embodiment, the hydrogenating agent is hydrogen gas.

The amount of hydrogenation can be measured using UV-VIS spectroscopy. Cyclohexane solutions of polystyrene give a very distinct absorption band for the aromatic ring at about 260.5 nm. This band gives an absorbance of 1.000 with a solution concentration of 0.004980 moles of aromatic per liter in a 1 cm cell. After removing the catalyst via filtration (using a 0.50 micrometer (μm) "TEFLON™" filter, Millipore FHUP047) the reaction mixture is placed in a UV cell and the absorbance measured. The absorbance is dependent upon concentration. The hydrogenated polymer products are typically measured at higher concentrations since they are not diluted before the absorbance is measured. Since the reaction solution is about 15–30 times more concentrated than the standards, small amounts of residual unsaturation can be accurately measured.

The amount of hydrogenation is dependent upon the polymer being hydrogenated, the amount of catalyst used, the process conditions and the reaction time. For polymers such as polystyrene and styrene-butadiene copolymers, a typical hydrogenation is greater than 80%, greater than 99% hydrogenation is preferred, more preferably greater than 99.5%, and most preferably greater than 99.9%. This can be determined by measuring the absorbance of the hydrogenated polymer and comparing to the absorbance of a non-hydrogenated standard. In other words, the absorbance of a 99.9% hydrogenated polymer will be 99.9% less than the absorbance of the nonhydrogenated polymer. For polymers such as poly alpha-methylstyrene, styrene-alpha-methylstyrene copolymer and copolymers of a vinyl aromatic monomer and a comonomer selected from the group consisting of a nitrile, acrylate, acid, ethylene, propylene, maleic anhydride, maleimide, vinyl acetate and vinyl chloride, the level of hydrogenation can be lower, and is dependent upon the polymer being hydrogenated. Typically, at least 10% hydrogenation is achieved, preferably at least 25%, more preferably at least 50% and most preferably at least 90% hydrogenation is achieved.

In one embodiment of the present invention the aromatic polymer is typically dissolved in a solvent and placed in a reactor with an appropriate amount of silica supported hydrogenation catalyst. The reactor is sealed, purged with an inert gas, pressurized with hydrogen and heated to the desired temperature for a time sufficient to substantially hydrogenate the aromatic polymer. The hydrogenated polymer is removed and the catalyst can be separated from the hydrogenated polymer by any conventional catalyst separation method, such as filtration or centrifugation.

The hydrogenated polymers of the present invention have higher glass transition temperatures than their nonhydrogenated counterparts. For example, atactic hydrogenated polystyrene polymers of the present invention typically have glass transition temperatures measured by Differential Scanning Calorimetry (DSC) with a heating rate of 3° C. per minute, of at least 141° C., preferably from 141° C. to 147° C., more preferably from 143° C. to 147° C., and most preferably from 145° C. to 147° C. Therefore, these polymers can be used in applications where high temperature resistance is required, such as applications where polycarbonates currently are used.

The following examples are set forth to illustrate the present invention and should not be construed to limit its scope. In the examples, all parts and percentages are by weight unless otherwise indicated.

The amount of hydrogenation is measured using UV-VIS spectroscopy as described previously.

Mw is an absolute molecular weight measured by gel permeation chromatography, unless otherwise specified.

All polymer samples used in the examples have atactic stereostructure.

EXAMPLES

Example 1

A) Preparing the Silica Support 150 g of potassium silicate (Kasil #1, a product of PQ Corp.) and 10 g of water is charged to a 250 milliliter (ml) beaker and stirred while 15 grams(g) of formamide is added slowly such that no precipitation occurs. The mixture is continuously stirred for about 5 minutes until a clear homogeneous solution is obtained. The mixture is then placed in an 80° C. oven for 5 hours and the silica polymerized. The silica is removed, broken into pieces of less than 8 mesh, and washed with 500 ml of 1M acetic acid, 500 ml of 1M ammonium acetate and finally with 500 ml of 80° C. 1M ammonium acetate. The washed silica is placed in a 1.0 inch O.D. quartz tube and a flow of air at room temperature is started over the silica. The silica then undergoes a hydrothermal calcination. The following procedure is used, the silica is heated from 25° C. to 850° C. at a rate of 3.5° C./min. Upon reaching 150° C., the air is passed through a bubbler to saturate with water while the heating continues. At 850° C. the calcination is continued isothermally for 2 hours. The silica is then cooled to 350° C. with water saturated air. Upon reaching 350° C. the saturator is removed and the silica is cooled with dry flowing air to about 80° C. and removed from the quartz tube. The data below shows the pore size distribution via mercury porosimetry.

| | |
|---|---|
| Pore Volume | 1.37 cc/g |
| Total Pore Area | 14.2 m²/g |
| Median Pore Diameter (Volume) | 3845 angstroms |
| Median Pore Diameter (area) | 3672 angstroms |
| Average Pore Diameter (4V/A) | 3817 angstroms |

Three additional batches are prepared using the same procedure described above and are shown in Table I. The surface area of Table I is measured according to ASTM method D-3663-84.

TABLE I

| Sample | Pore Volume (cc/g) | Average Pore Diameter (4V/A) (angstroms) | Surface Area (m²/g) |
|---|---|---|---|
| 1 | 1.4 | 3800 | 14 |
| 2 | 1.6 | 3600 | 17 |
| 3 | 1.5 | 3900 | 15 |

However, mercury porosimetry should not be relied on alone to check pore size distributions because it is not sensitive to pores of less than 60 angstroms. Nitrogen desorption techniques measures pores of less than 600 angstroms. Using this technique, the silica as prepared in Sample 1 above has a cumulative pore volume in pores of less than 100 angstroms of 0.006 cc/g, a cumulative pore volume in pores of less than 320 angstroms of 0.013 cc/g and a cumulative pore volume in pores of less than 600 angstroms of 0.016 cc/g. Therefore, the cumulative pore volume for pores less than 600 angstroms is about 1.1 percent of the cumulative pore volume for pores greater than 60 angstroms.

B1) Preparation of 5% Rh/SiO$_2$ Catalyst

A 5% Rh/SiO$_2$ catalyst is made via impregnation of the hydrothermally calcined silica of (A). RhCl$_3$(H$_2$O)$_{2.5}$ (0.65 g) is dissolved in 16.5 ml of water. This solution is then added to 5.0 g of the hydrothermally calcined silica of (A), which is then air dried overnight. The catalyst is then ground with a mortar and pestle to less than 100 mesh. The catalyst is reduced by loading the catalyst in a 1.0 in. O.D. glass tube purged with nitrogen and then a flow of hydrogen is started over the catalyst. The temperature is ramped from 25° C. to 250° C. at 10° C./min in flowing hydrogen and the catalyst is held isothermally at 250° C. for 2 hours. The catalyst is cooled under flowing hydrogen.

B2) Preparation of 5% Pt/SiO$_2$ Catalyst

A 5% Pt/SiO$_2$ catalyst is made via impregnation of the hydrothermally calcined silica of (A). H$_2$PtCl$_6$.6(H$_2$O) (0.70 g) is dissolved in 16.5 ml of water. This solution is then added to 5.0 g of the hydrothermally calcined silica of (A) which is then air dried overnight. The catalyst is then ground with a mortar and pestle to less than 100 mesh. The catalyst is reduced by loading the catalyst in a 1.0 in. O.D. glass tube purged with nitrogen and then a flow of hydrogen is started over the catalyst. The temperature is ramped from 25° C. to 250° C. at 10° C./min in flowing hydrogen and the catalyst is held isothermally at 250° C. for 2 hours. The catalyst is cooled under flowing hydrogen.

Example 2

Hydrogenation of Polystyrene

Two solutions containing 3 g of polystyrene (Mw approximately 100,000, Mw/Mn 1.09) dissolved in 156 g of cyclohexane (200 ml) are each placed in a 300 ml Parr reactor. One reactor receives 0.8 g of 5% Rh/SiO$_2$ catalyst prepared according to Example 1, (B1) and the other 1.0 g of 5% Pd/BaSO$_4$ obtained from Engelhard Corp. for comparison purposes. The reactors are sealed, pressure purged with nitrogen and finally pressurized with hydrogen to 1300 psig. The reactors are then heated to 130° C., the pressure adjusted to 1500 psig and the reaction run for 4 hours. The results are listed in Table II.

TABLE II

| Catalyst | Source | Percent Hydrogenation | Catalyst/Polymer Ratio |
|---|---|---|---|
| 5% Rh/SiO$_2$ | Example 1 (B1) | >99.9 | 0.27 |
| Comparative Example 5% Pd/BaSO$_4$ | Engelhard Corp. | 14 | 0.33 |

The level of hydrogenation for the catalyst of the invention is measured at greater than 99.9% at a catalyst to polymer ratio of 0.27 and Mw/Mn is measured to be 1.10, which indicates that no significant polymer degradation has occurred. Four analyses of the hydrogenated polymer give an average Tg of 146.2° C. ±0.5.

A Pd metal catalyst supported on an alkaline earth metal support used at a catalyst to polymer ratio of 0.3 shows very low hydrogenation.

Example 3

Hydrogenation of Polystyrene 3 grams of polystyrene (Mw approximately 300,000) are dissolved in 156 g of cyclohexane (200 ml) and placed in a 300 ml Parr reactor with 0.8g of the catalyst as listed in Table III. The silica supported catalysts were prepared as in Example 1, (B1) and (B2). The reactor is sealed and pressure purged with nitrogen and finally pressurized with hydrogen to 1300 psig. The reactor is then heated to 140° C., the pressure adjusted to 1500 psig and the reaction run for 6 hours. The products are analyzed and the results are listed in Table III.

TABLE III

| Catalyst | Source | Percent Hydrogenation |
|---|---|---|
| 5% Pt/SiO$_2$ | Example 1 (B2) | 99.7 |
| 5% Rh/SiO$_2$ | Example 1 (B1) | 99.9 |
| Comparative Example 5% Rh/Al$_2$O$_3$ | Engelhard Corp. | 7 |

The catalysts of the present invention give much higher hydrogenation levels at a catalyst to polymer ratio of 0.27 than a known hydrogenation catalyst. Four analyses of the hydrogenated polymer using 5% Pt/SiO$_2$ catalyst give an average Tg of 146.6° C. ±0.6.

Example 4

Hydrogenation of 196,700 Mw Polystyrene (Catalyst to Polymer Ratio of 0.27)

3 grams of polystyrene (Mw 196,700) is dissolved in 235 g of cyclohexane at 50° C. and placed in a 300 ml Parr reactor with 0.8 g of a reduced 5% Pt/SiO$_2$ catalyst prepared as in Example 1, (B2). The reactor is sealed, pressure purged with nitrogen and finally pressurized with hydrogen to 1300 psig. The reactor is then heated to 138° C., the pressure adjusted to 1500 psig and the reaction run for 7 hours. The product is analyzed and shows 99.94 percent hydrogenation with Mw of 181,400, which indicates that no significant polymer degradation has occurred.

Example 5

Hydrogenation of Polystyrene (Catalyst to Polymer Ratio of 0.07)

200 g of polystyrene (Mw approximately 200,000) is added to a 5 gallon reactor containing 2300 g of cyclohexane. The reactor is purged with nitrogen and 13.5 g of a reduced 5% Pt/SiO$_2$ catalyst prepared as in Example 1, (B2) is added. The reactor is sealed, pressure purged with nitrogen, pressurized with hydrogen to 500 psig and heated to 150° C. The pressure is adjusted to 875 psig and maintained at this pressure at 150° C. Samples taken after 55 minutes show hydrogenation of 94.3% and samples taken after 110 minutes show hydrogenation of 98.4%.

High hydrogenation levels are obtained at a small catalyst to polymer ratio of 0.07.

Example 6

Comparison of Hydrogenation of Polystyrene Using 5% Pt/SiO$_2$ and 5% Pt/Diatomaceous Earth Two experiments are run with 5 g of approximately 100,000 Mw polystyrene with Mw/Mn of 1.05 added to a 500 ml reactor containing 235 g cyclohexane. 5% Pt/SiO$_2$ made according to Example 1, (B2) is added to one reactor while a 5% Pt/Diatomaceous Earth prepared according to U.S. Pat. No. 5,110,779 is added to the other for comparison purposes. The reactor is sealed, pressure purged with nitrogen, filled with hydrogen at 1000 psig and heated to 140° C. The pressure is adjusted to 1500 psig and the reactor maintained at 140° C. and 1500 psig for 4 hours. Results are listed in Table IV.

TABLE IV

| Catalyst | Catalyst Weight (g) | Percent Hydrogenation | Mw/Mn |
| --- | --- | --- | --- |
| 5% Pt/SiO$_2$ | 1.7 | 99.8 | 1.05 |
| Comparative Example 5% Pt/Diatomaceous Earth | 2.0 | 90.0 | 1.05 |

The performance of the catalyst of the present invention at a catalyst to polymer ratio of 0.34 shows a much higher hydrogenation level when compared to a 5% Pt/Diatomaceous Earth catalyst even when used at a higher catalyst to polymer ratio of 0.4.

Example 7

Hydrogenation of Poly alpha-MethylStyrene 3.0 grams of poly alpha-methylstyrene (Mw 299,000 as measured by Low Angle Laser Light Scattering (LALLS)) is dissolved in 235 g of cyclohexane at 50° C. and placed in a 300 ml Parr reactor with 0.8 g of a reduced 5% Rh/SiO$_2$ catalyst prepared according to Example 1, (B1). The reactor is sealed, pressure purged with nitrogen and finally pressurized with hydrogen to 1300 psig. The reactor is then heated to 138° C., the pressure adjusted to 1500 psig and the reaction run for 7 hours. The product is analyzed and shows 99.85 percent hydrogenation with little change in Mw (213,000 measured by LALLS), which indicates that no significant polymer degradation has occurred.

Example 8

Hydrogenation of Styrene-Isoprene-Styrene 5 g of styrene-isoprene-styrene polymer (Kraton D-1107, a product of The Shell Chemical Co.) is added to a 500 ml reactor containing 235 g of cyclohexane. Under an inert atmosphere, a 0.8 g sample of reduced 5% Pt/SiO$_2$ prepared as in Example 1, (B2) is added to the reactor. The reactor is then sealed, pressure purged with nitrogen, filled with hydrogen at 1000 psig and heated to 120° C. The pressure is adjusted to 1500 psig and the reactor is maintained at 120° C. and 1500 psig for 4 hours. The product shows complete hydrogenation of the olefinic region and 98.5% hydrogenation of the aromatic region.

The process of the present invention is successfully used on polymers containing both ethylenic unsaturation and aromatic unsaturation.

Example 9

Hydrogenation of Styrene Acrylonitrile Copolymer 4 g of a styrene acrylonitrile copolymer containing 75 wt. % styrene is added to a 500 mL reactor containing 220 g of tetrahydrofuran. Under an inert atmosphere a 1.5 g sample of reduced 5% Rh/SiO$_2$ is added to this mixture. The reactor is then sealed, pressure purged with nitrogen, filled with hydrogen at 1000 psig and heated to 120° C. The temperature is then increased to 160° C. and the pressure is adjusted to 1500 psig. After 7 hours, the reactor is cooled and vented at atmospheric pressure and the catalyst is filtered from the polymer solution. Analysis shows 17 percent hydrogenation of the aromatic portion of the polymer.

What is claimed is:

1. A silica supported metal catalyst, characterized in that the silica has a surface area of at least 10 m$^2$/g and a narrow pore size distribution such that at least 98 percent of the pore volume measured by mercury porosimetry is defined by pores having diameter of greater than 600 angstroms, and the pore volume measured by nitrogen desorption for pores less than 600 angstroms, is less than 2 percent of the total pore volume measured by mercury porosimetry.

2. The catalyst of claim 1 wherein the surface area is from about 10 m$^2$/g to about 50 m$^2$/g.

3. The catalyst of claim 1 wherein the metal is cobalt, nickel, ruthenium, rhodium, palladium, platinum or combination thereof.

4. The catalyst of claim 3 wherein the metal is platinum or rhodium.

5. The catalyst of claim 1 wherein the pores have an average diameter of from 3000 to 5000 angstroms.

* * * * *